United States Patent
Sung et al.

(10) Patent No.: US 12,535,593 B2
(45) Date of Patent: Jan. 27, 2026

(54) OBJECT DETECTION METHOD AND OBJECT TRACKING DEVICE USING LIDAR SENSOR

(71) Applicants: HYUNDAI MOTOR COMPANY, Seoul (KR); KIA CORPORATION, Seoul (KR)

(72) Inventors: Yo Han Sung, Goyang-si (KR); Ju Heon Baeg, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 840 days.

(21) Appl. No.: 17/885,852

(22) Filed: Aug. 11, 2022

(65) Prior Publication Data

US 2023/0050013 A1    Feb. 16, 2023

(30) Foreign Application Priority Data

Aug. 13, 2021   (KR) .................. 10-2021-0107470

(51) Int. Cl.
*G01S 17/931*   (2020.01)
*G01S 7/41*   (2006.01)

(52) U.S. Cl.
CPC .............. *G01S 17/931* (2020.01); *G01S 7/41* (2013.01)

(58) Field of Classification Search
None
See application file for complete search history.

(56) References Cited

U.S. PATENT DOCUMENTS

| | | | |
|---|---|---|---|
| 2020/0282832 A1* | 9/2020 | Watanabe | B60K 35/28 |
| 2020/0293796 A1* | 9/2020 | Sajjadi Mohammadabadi | B60W 30/095 |
| 2021/0035447 A1* | 2/2021 | Urano | G08G 1/0125 |
| 2022/0099838 A1* | 3/2022 | Kim | G01S 17/931 |

FOREIGN PATENT DOCUMENTS

| | | |
|---|---|---|
| JP | 2004-198323 A | 7/2004 |
| JP | 2017-150895 A | 8/2017 |
| JP | 2020-026981 A | 2/2020 |
| KR | 10-2010-0007007 A | 1/2010 |
| KR | 10-1480651 B1 | 1/2015 |
| KR | 10-1714233 B1 | 3/2017 |

\* cited by examiner

*Primary Examiner* — Miya J Cato
(74) *Attorney, Agent, or Firm* — Morgan Lewis & Bockius LLP

(57) ABSTRACT

An object detection method using a lidar sensor of an embodiment includes determining whether a box of a target object is a box in which an overlapping object present therein can be deleted on the basis of shape information of the target object obtained by the lidar sensor, and generating a box track of the target object after removing the overlapping object according to a determination result.

19 Claims, 15 Drawing Sheets

L-shape          I-shape $f_k(x)$ : Function of straight line $\overline{P_k P_{k+1}}$
$d_n$ : Distance between straight line $\overline{P_n P_{n+1}}$ and origin $f_k(x)$ : Function of straight line $\overline{P_k P_{k+1}}$
$d_n$ : Distance between straight line $\overline{P_n P_{n+1}}$ and origin

OBJECT DETECTION METHOD AND OBJECT TRACKING DEVICE USING LIDAR SENSOR

The present application claims the benefit of Korean Patent Application No. 10-2021-0107470, filed on Aug. 13, 2021, which is hereby incorporated by reference as if fully set forth herein.

TECHNICAL FIELD

Embodiments relate to an object detection method and an object tracking device using a lidar sensor.

BACKGROUND

Information on a target vehicle can be obtained using a LIDAR (Light Detection and Ranging) sensor, and an autonomous driving function of a vehicle (hereinafter referred to as a "host vehicle") equipped with sensors can be assisted using the obtained information. However, when the information on the target vehicle obtained using the lidar sensor is inaccurate, the reliability of the host vehicle may deteriorate due to inaccurate information processing, and thus improvement thereof is required.

SUMMARY

Embodiments provide an object detection method and an object tracking device using a lidar sensor, which can improve the accuracy of object detection using the lidar sensor and improve system performance.

It will be appreciated by persons skilled in the art that the objects that could be achieved with the present disclosure are not limited to what has been particularly described hereinabove and the above and other objects that the present disclosure could achieve will be more clearly understood from the following detailed description.

To achieve these objects and other advantages and in accordance with the purpose of the disclosure, as embodied and broadly described herein, an object detection method using a lidar sensor may include determining whether a box of a target object is a box in which an overlapping object present inside the box is removable on the basis of shape information of the target object obtained by the lidar sensor, and generating a box track of the target object after removing the overlapping object according to a determination result.

For example, the determining of whether the box is a box in which an overlapping object is removable may include setting a representative side among four box sides forming the box of the target object on the basis of the shape information of the target object, and determining whether the overlapping object is removable on the basis of distances between the representative side and the remaining box sides other than the representative side and a host vehicle which includes the lidar sensor.

For example, the setting of the representative side may include setting one representative side when the shape information of the target object includes I-shape information and setting two representative sides when the shape information of the target object includes L-shape information.

For example, the setting of the representative side may include setting a box side closest to grouped points constituting the shape of the target object among the four box sides as the representative side.

For example, the setting of the representative side may include setting one box side closest to points clustered in an I shape in the box as the representative side, when the shape information of the target object includes I-shape information.

For example, the setting of the representative side may include setting two box sides closest to points clustered in an L shape in the box as the representative side, when the shape information of the target object includes L-shape information.

For example, the determining of whether the box is a box in which an overlapping object is removable may include determining the box as a box in which an overlapping object is removable, when the distance between the representative side and the host vehicle is less than the distances between the remaining box sides and the host vehicle.

For example, the determining of whether the box is a box in which an overlapping object is removable may include redefining a point order of vertices of the box on the basis of the representative side, setting coordinates of the vertices by defining a position of the host vehicle as an origin, calculating a function of the representative side of the box and a function of the remaining box sides on the basis of the coordinates of the vertices, and determining whether the box is a box in which an overlapping object is removable on the basis of a distance between the function of the representative side and a function passing through the origin and a distance between the function of the box sides and the function passing through the origin.

For example, the determining of whether the box is a box in which an overlapping object is removable may include determining the box as a box in which an overlapping object is removable when the shape information of the target object includes I-shape information, the distance between the representative side and the origin is less than a distance between a box side parallel to the representative side and the origin, and the origin is not present between the representative side and the box side parallel to the representative side.

For example, the determining of whether the box is a box in which an overlapping object is removable may include determining the box as a box in which an overlapping object is removable when the shape information of the target object includes L-shape information, distances between two representative sides and the origin are less than distances between box sides parallel to the two representative sides and the origin, and the origin is not present inside the box.

For example, the generating of a box track of the target object after removing the overlapping object according to a determination result may include removing a box of the overlapping object when all of four vertices of the box of the overlapping object are present within the box of the target object, and generating the track on the basis of the box of the target object from which the box of the overlapping object has been removed.

For example, the object detection method using a lidar sensor may further include clustering point cloud data obtained using the lidar sensor, generating a box of at least one object on the basis of clustered points, and determining shape information of the object according to a shape of points constituting the object.

For example, the shape information of the target object may include I-shape information or L-shape information.

In another aspect of the present disclosure, a non-transitory computer-readable recording medium recording a program that, when executed by a processor, causes the processor to perform an object detection method using a lidar sensor to include steps of: determining whether a box of a target object is a box in which an overlapping object present inside the box is removable on the basis of shape information of the target object obtained by the lidar sensor, and generating a box track of the target object after removing the overlapping object according to a determination result, may be read by a computer In another aspect of the present disclosure, an object detection device using a lidar sensor may include a lidar sensor for obtaining a point cloud for a target object and a clustering unit for clustering the point cloud, an object detection unit for determining whether a box of the target object is a box in which an overlapping object present inside the box is removable on the basis of shape information of the target object and removing the overlapping object according to a determination result, and an object tracking unit for generating a track by tracking the box of the target object from which the overlapping object has been removed.

For example, the object detection unit may include a representative side determination unit for setting a representative side among four box sides forming the box of the target object on the basis of the shape information of the target object, a box analysis unit for determining whether the box is a box in which an overlapping object is removable on the basis of distances between the representative side and the remaining box sides other than the representative side and a host vehicle which includes the lidar sensor, and an overlapping box processing unit for determining whether all of four vertices of a box of the overlapping object are present within the box of the target object and removing the box of the overlapping object when the box is a box in which the overlapping object is removable.

For example, the representative side determination unit may set one box side closest to points clustered in an I shape within the box as the representative side when the shape information of the target object includes I-shape information, and set two box sides closest to points clustered in an L shape within the box as the representative side when the shape information of the target object includes L-shape information.

For example, the box analysis unit may determine the box as a box in which an overlapping object is removable when the distance between the representative side and the host vehicle is less than the distances between the remaining box sides and the host vehicle.

For example, the box analysis unit may redefine point order of the vertices of the box on the basis of the representative side, set coordinates of the vertices by defining a position of the host vehicle as an origin, calculate a function of the representative side of the box and a function of the remaining box sides on the basis of the coordinates of the vertices, and determine whether the box is a box in which an overlapping object is removable based on a distance between the function of the representative side and a function passing through the origin and a distance between the function of the box sides and the function passing the origin.

The object detection method and the object tracking device using a lidar sensor according to embodiments can remove an erroneously detected object to improve the accuracy of object detection and enhance the system efficiency by not considering an object that does not need to be tracked in an object tracking step by determining whether or not overlapping small boxes located in a box can be removed using shape information of objects and then removing removable boxes.

In addition, since the object detection method and the object tracking device using a lidar sensor according to the embodiments generate a track by tracking an object after removing an erroneously detected object, accuracy at the time of generating a lidar track can be improved.

It will be appreciated by persons skilled in the art that the effects that can be achieved with the present disclosure are not limited to what has been particularly described hereinabove and other advantages of the present disclosure will be more clearly understood from the following detailed description.

DETAILED DESCRIPTION

Figure 1:
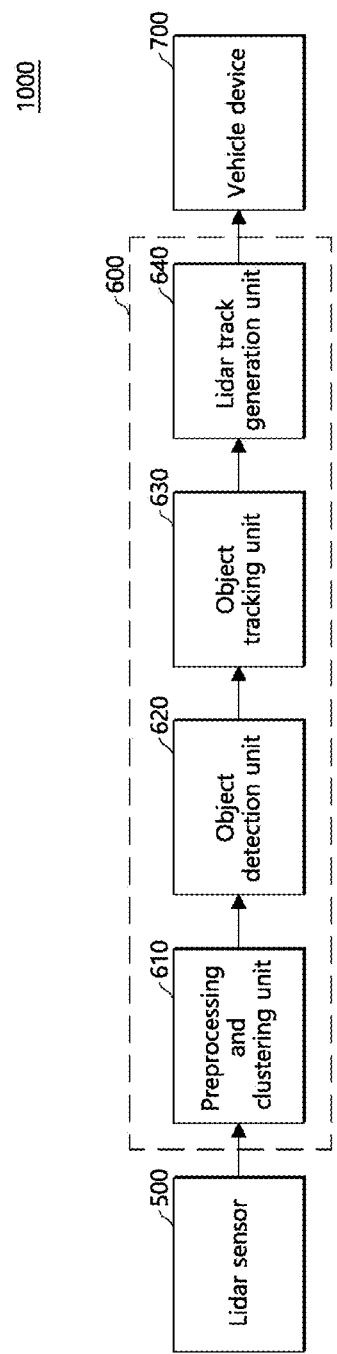
FIG. 1 is a block diagram of a vehicle including an object tracking device using a lidar sensor according to an embodiment.

Hereinafter, embodiments of the present disclosure will be described in detail with reference to the accompanying drawings to aid in understanding of the present disclosure. However, embodiments according to the present disclosure may be modified in various manners, and the scope of the present disclosure should not be construed as being limited to the embodiments described below. The embodiments of the present disclosure are provided in order to more completely explain the present disclosure to those of ordinary skill in the art.

In description of embodiments, when an element is described as being formed on "on" or "under" of another element, "on" or "under" includes a case where both elements are in direct contact with each other or a case in which one or more other elements are indirectly disposed between the two elements.

In addition, in the case of representation of "on" or "under", it may include the meaning of the downward direction as well as the upward direction based on one element.

Further, relational terms such as "first", "second," "top"/"upper"/"above" and "bottom"/"lower/"under" used below may be used to distinguish a certain entity or element from other entities or elements without requiring or implying any physical or logical relationship between entities or order thereof.

Through the specification, when it is said that some part "includes" a specific element, this means that the part may further include other elements, not excluding them, unless otherwise mentioned. In order to clearly explain the present disclosure in the drawings, parts irrelevant to the description are omitted, and similar reference numerals are assigned to similar parts throughout the specification.

According to the present embodiment, it is possible to generate a more accurate outline shape of a lidar track and prevent unnecessary object tracking to improve system efficiency by determining whether detected small objects overlapping inside a box fitted with a large object during object detection using a lidar (Light Detection and Ranging) sensor are objects that must be tracked, such as pedestrians, or objects that do not need to be tracked, for example, detected objects overlapping inside a vehicle due to light transmission through a window of a building or a bus and deleting removable internal objects.

Hereinafter, an object detection method and an object tracking device using a lidar sensor according to an embodiment will be described with reference to the drawings. Although an object detection method and an object tracking device using a lidar sensor will be described using a Cartesian coordinate system (x-axis, y-axis, z-axis) for convenience, the object detection method and the object tracking device can also be described using other coordinate systems.

FIG. 1 is a block diagram of a vehicle including an object tracking device using a lidar sensor according to an embodiment.

Referring to FIG. 1, a vehicle 1000 may include a lidar sensor 500, an object tracking device 600 that processes data obtained from the lidar sensor 500 to output object tracking information on tracking of an object around the vehicle 1000, and a vehicle device 700 that controls various functions of the vehicle 1000 according to the object tracking information.

The lidar sensor 500 may radiate, for example, a single circular laser pulse having a wavelength of 905 nm to 1550 nm to objects, and then measure a return time of the laser pulse reflected from an object within a measurement range to sense information on the object, such as a distance between the sensor 500 and the object, and the direction, speed, temperature, material distribution, and concentration characteristics of the object. Here, an object may be another vehicle, a person, a thing, or the like present outside the vehicle (hereinafter, referred to as a "host vehicle") 1000 equipped with the lidar sensor 500, but the embodiment is not limited to a specific type of object. The lidar sensor 500 may output point cloud data (referred to hereinafter as "lidar data") composed of a plurality of points for a single object.

The object tracking device 600 may receive lidar data, check presence or absence of an object using the lidar data, start, maintain or stop tracking of the object, update, store or delete information on the object, and classify the type of the object. The object tracking device 600 may include a preprocessing and clustering unit (e.g., a preprocessing and clustering module) 610, an object detection unit (e.g., an object detection module) 620, an object tracking unit (e.g., an object tracking module) 630, and a lidar track generation unit (e.g., a lidar track generation module) 640.

The preprocessing and clustering unit 610 may preprocess point cloud type lidar data received from the lidar sensor 500 into a form that can be processed and then cluster the same. The preprocessing and clustering unit 610 may preprocess the lidar data by removing ground points. In addition, the preprocessing and clustering unit 610 may preprocess the lidar data by converting the lidar data into a form suitable for a reference coordinate system according to the angle of the position where the lidar sensor 500 is provided and removing points with low intensity or reflectance by filtering on the basis of intensity or confidence information on the lidar data. Since there is an area covered by the body of the host vehicle depending on the position where the lidar sensor 500 is provided and the viewing angle of the lidar sensor 500, the preprocessing and clustering unit 610 may remove data reflected from the body of the host vehicle using the reference coordinate system. Since preprocessing of lidar data serves to refine valid data, some or all of processing may be omitted or other types of processing may be added. The preprocessing and clustering unit 610 may cluster the preprocessed point cloud into significant units according to a predetermined rule. The result detected by the lidar sensor 500 includes a plurality of points having position information. Accordingly, the preprocessing and clustering unit 610 may cluster the plurality of points into significant shape units and output the same to the object detection unit 620.

The object detection unit 620 generates information on a plurality of boxes using the clustering result. The object detection unit 620 may generate a contour using clustered points and determine a shape of an object on the basis of the generated contour. The object detection unit 620 may detect a box that fits the object on the basis of the determined shape of the object. Information on a box may include at least one of a width, a length, a position, and a direction (or heading) of the segment box. A plurality of boxes may be obtained for the same object according to the visibility of the lidar sensor 500 and the shape of the object. Accordingly, N segment boxes may be generated by the object detection unit 620 at the current time t for a unit target object and provided to the object tracking unit 630.

The object tracking unit 630 selects a "box associated" with an object being tracked (referred to hereinafter as a "target object") at the current time t from among a plurality of boxes. Here, "association" refers to a process of selecting a box to be used to maintain tracking of a target object currently being tracked from among a plurality of pieces of box information. Association may be performed every cycle. In order to select an associated box from the plurality of boxes, the object tracking unit 630 may convert information on each of the plurality of boxes into a predetermined format and select an associated box from among a plurality of boxes (or boxes of meta-objects) having the converted format.

The lidar track generation unit 640 generates a track trk according to a target object on the basis of associated boxes and outputs the generated track to the vehicle device 700. When M target objects are tracked, M tracks are generated. Information accumulated before the current time t with respect to the target object being tracked, for example, position information and speed information on the target object for each time period, may be stored as history information. A unit in which history information on a unit target object is stored is referred to as a "channel", and the number of channels is the same as the number of tracks trk.

The vehicle device 700 may receive a lidar track for each channel from the object tracking device 600 and apply the same to control a driving function.

Figure 2:
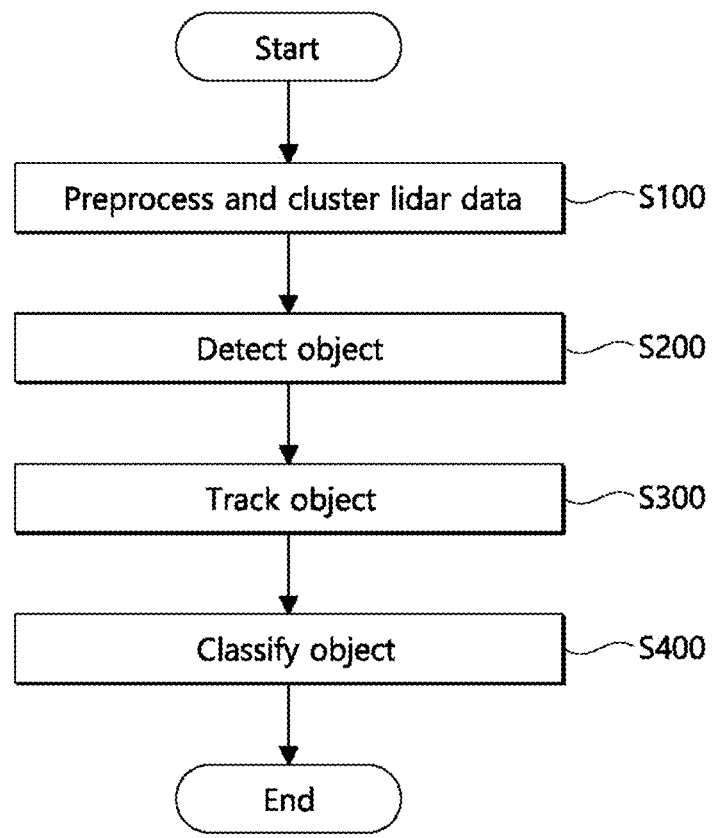
FIG. 2 is a flowchart of an object tracking method using a lidar sensor according to an embodiment.

FIG. 2 is a flowchart of an object tracking method using a lidar sensor according to an embodiment.

The object tracking device 600 preprocesses point cloud type lidar data received from the lidar sensor 500 into a form that can be processed and then clusters the data (S100). The preprocessing and clustering unit 610 may perform preprocessing of removing ground data from the lidar data and cluster the preprocessed lidar data into significant shape units, that is, point units of parts considered to be the same object.

An object is detected on the basis of the clustered points (S200). The object detection unit 620 may generate a contour using the clustered points and generate and output a box depending on an object shape on the basis of the generated contour.

The object is tracked on the basis of the detected box (S300). The object tracking unit 630 selects boxes associated with the object being tracked from among a plurality of boxes. Here, "association" refers to a process of selecting a box to be used to maintain tracking of a target object currently being tracked from among a plurality of segment boxes. Association may be performed every cycle. The lidar track generation unit 640 may generate a track trk according to the target object on the basis of the associated boxes.

The type of the generated lidar track may be classified (S400) and may be reflected during driving control. The vehicle device 700 or the object tracking device 600 may classify lidar tracks for respective channels into specific objects such as a pedestrian, a guardrail, and a car, and then apply the same to control a driving function.

In the above-described object tracking method using a lidar sensor, the object detection unit 620 according to the embodiment may perform a process of processing overlapping boxes located inside a box in order to detect an object more precisely and process and minimize unnecessary object tracking.

Figure 3:
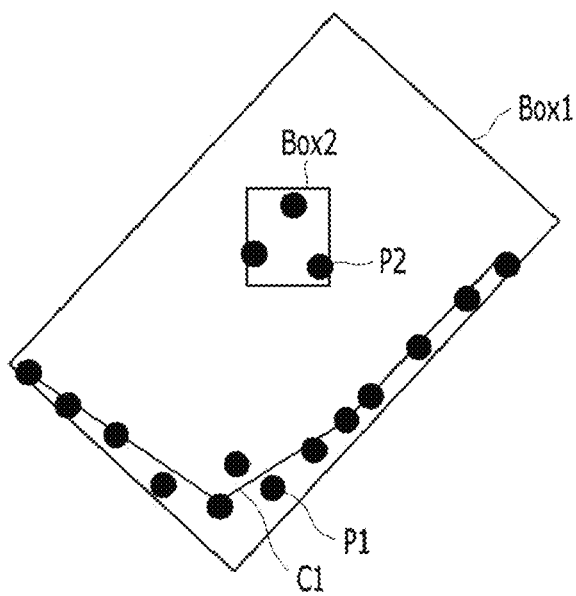
FIG. 3 to FIG. 5 are diagrams for describing a box detected by an object detector.
Figure 4:
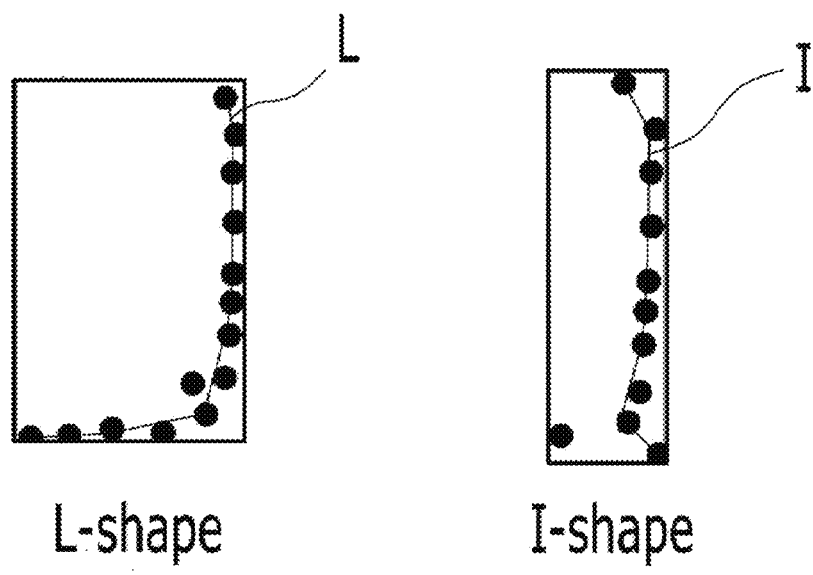
Figure 5:
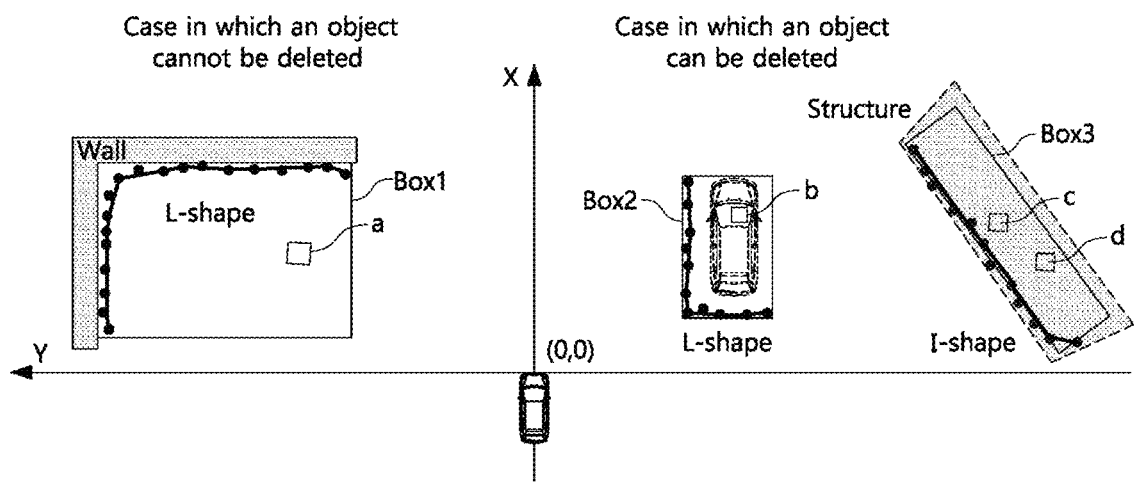

FIG. 3 to FIG. 5 are diagrams for describing boxes detected by the object detection unit 620.

Referring to FIG. 3, the object detection unit 620 may generate a contour C1 for a point cloud. The contour C1 may provide shape information indicating the shape of points P1 constituting an object. Referring to FIG. 4, if the shape of points constituting an object is similar to L, the shape may be determined as an L shape, and if it is similar to I, the shape may be determined as an I shape.

Thereafter, the object detection unit 620 may generate a first box Box1 on the basis of shape information of the contour C1 generated from clustered points P1. The generated first box Box1 may be determined as one object. Here, points P2 spaced apart from the contour C1 may be present inside the first box Box1 generated with a relatively large size, and a smaller second box Box2 that may include the points P2 may be generated.

Since the four sides of the first box Box1 do not necessarily mean the outermost side of the object, the small-sized second box Box2 generated inside the first box Box1 may be an object such as a pedestrian or a small object overlapping the inside of a vehicle or a building due to light transmission through a window of the vehicle or the building.

In a case where the second box (Box2) overlapping the first box (Box1) is a small object overlapping the inside of a vehicle or a building, when the second box Box2 is tracked and processed, system efficiency may deteriorate because the second box Box2 is irrelevant to vehicle driving. Therefore, it is preferable to delete the overlapping second box Box2 and perform processing of the next step. On the other hand, when the second box Box2 is an object that must be considered during driving, such as a pedestrian or a bicycle, the second box Box2 should not be deleted.

Referring to FIG. 5, the first box Box1 is a box generated on the basis of an L shape. Although the first box Box1 is generated on the basis of points clustered in an L shape, it may be a detected L-shaped wall in reality. Accordingly, the four sides of the first box Box1 do not match the outer side of the actual wall. Since an object a overlapping the first box Box1 may move out of the first box Box1 and the host vehicle may move into the first box Box1, the object a may collide with the host vehicle when the host vehicle moves and thus should not be deleted.

The second box Box2 is a box generated on the basis of an L shape and may be a vehicle in reality. Since an object b detected inside the second box Box2 is present inside the vehicle, it does not affect driving of the host vehicle. Accordingly, the object b overlapping the second box Box2 can be deleted.

A third box Box3 is a box generated on the basis of an I shape and may be a building in reality. Since objects c and d detected inside the third box Box3 are present inside the building, they do not affect driving of the host vehicle. Accordingly, the object c and the object d overlapping the third box Box3 can be deleted.

As described above, overlapping boxes may be deleted or may not be deleted. Therefore, the object detection unit 620 according to the embodiment can improve the accuracy of the contour of a final track and minimize unnecessary object tracking by determining whether overlapping boxes are objects that can be deleted and deleting the same or maintaining object tracking.

Figure 6:
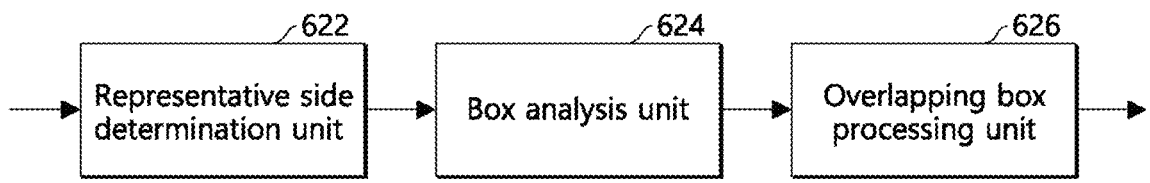
FIG. 6 is a block diagram illustrating an embodiment of the object detector shown in FIG. 1.

FIG. 6 is a block diagram showing an embodiment of the object detection unit 620 shown in FIG. 1.

Referring to FIG. 6, the object detection unit 620 may include a representative side determination unit (e.g., a representative side determination module) 622, an overlapping box analysis unit (e.g., an overlapping box analysis module) 624, and an overlapping box processing unit (e.g., an overlapping box processing module) 626.

The representative side determination unit 622 determines a representative side that prominently represents a shape among four sides of a box using shape information of an object. The shape information of the object may be detected as an I shape or an L shape. The representative side determination unit 622 may set one representative side in the case of an I-shaped box and may set two representative sides in the case of an L-shaped box.

The box analysis unit 624 determines whether a corresponding box is a box in which an overlapping box present therein can be removed on the basis of positional relationships between representative sides of boxes and the host vehicle. The box analysis unit 624 may determine whether a corresponding box is a box in which an overlapping box present therein can be removed by analyzing a positional relationship between a representative side of each box and the host vehicle on a coordinate plane having the position of the host vehicle as the origin.

The overlapping box processing unit 626 determines whether small overlapping boxes are completely included in a large box with respect to only boxes in which overlapping boxes present therein can be removed, and then removes the overlapping boxes.

Figure 7:
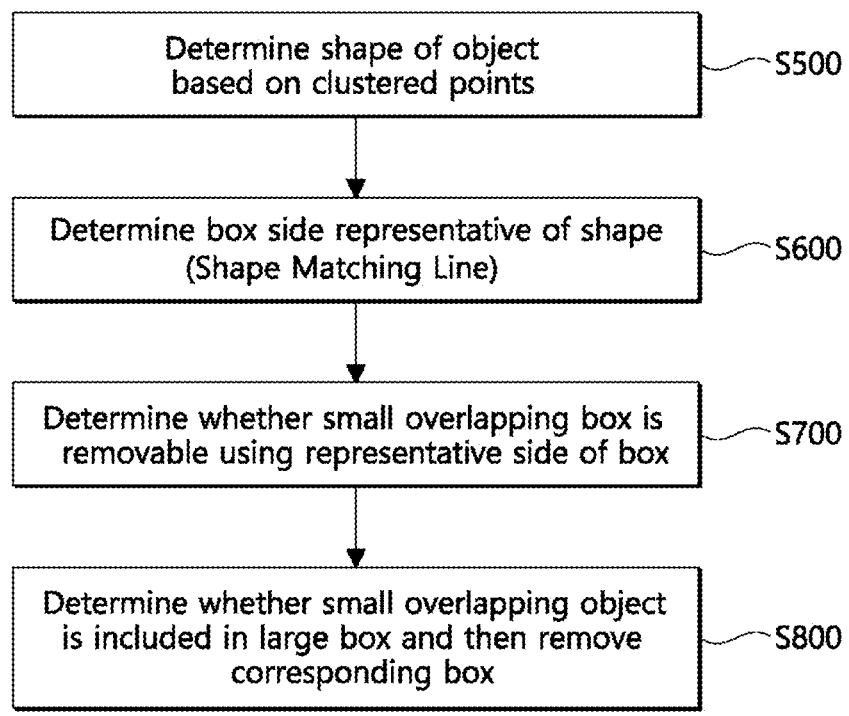
FIG. 7 and FIG. 8 are flowcharts for describing a control flow of the object detector according to an embodiment.
Figure 8:
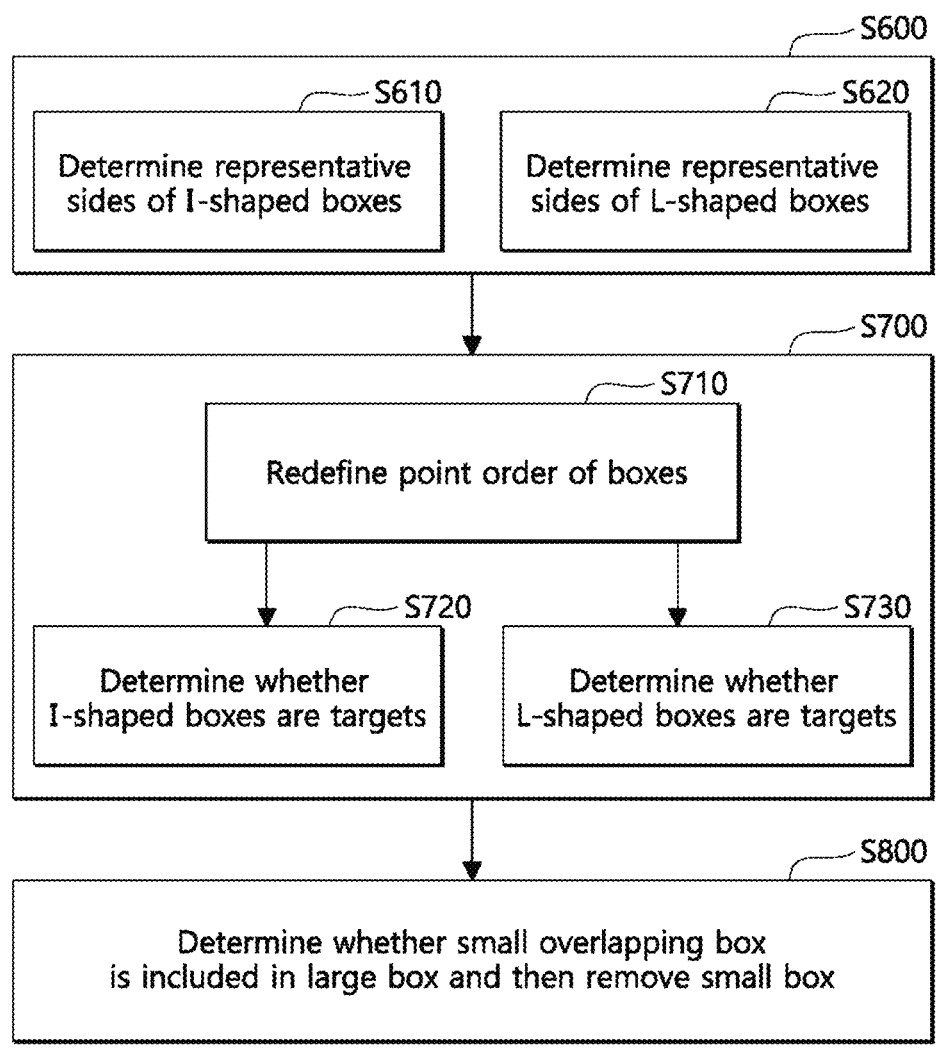

FIG. 7 and FIG. 8 are flowcharts for describing a control flow of the object detection unit according to an embodiment. FIG. 7 is a flowchart for describing a control flow of the object detection unit 620 according to an embodiment, and FIG. 8 is a flowchart showing the object detection method of FIG. 7 in more detail.

Referring to FIG. 7, the object detection unit 620 may generate a contour using clustered points and determine the shape of an object on the basis of the generated contour (S500). The shape of the object may be determined as an L shape or an I shape according to the shape of the clustered points.

Thereafter, a representative side that prominently represents a shape among the four sides of a box is determined using the shape information of the object (S600). One representative side can be set in the case of an I-shaped box, and two representative sides can be set in the case of an L-shaped box.

When the representative side is set, it is determined whether the corresponding box is a box in which an overlapping box present therein can be removed (S700) on the basis of a positional relationship between the representative side and a host vehicle. The box analysis unit 624 of the object detection unit 620 may determine whether the corresponding box is a box in which an overlapping box present therein can be removed by analyzing a positional relationship between a representative side of each box and the host vehicle on a coordinate plane having the position of the host vehicle as the origin.

Upon determining that the corresponding box is a box in which an overlapping box can be removed, it is determined whether small overlapping boxes are completely included in the large box, and if it is determined that small overlapping boxes are completely included in the large box, then the overlapping small boxes are removed (S800).

A method of removing an overlapping box by the object detection unit 620 will be described in detail with reference to the flowchart of FIG. 8 and FIGS. 9 to 14.

Referring to FIG. 8, step S600 of determining a representative side that prominently represents the shape among the four sides of the box using the shape information of the object may include step S610 of determining a representative side of an I-shaped box and step S620 of determining a representative side of an L-shaped box.

In step S610 of determining the representative side of the I-shape box, the one best representative side that represents characteristics of the I shape among the four sides may be determined. A box side having a smallest vertical projection distance between points included in points clustered in the I shape and the box sides may be determined as a representative side of the I-shape box.

Figure 9:
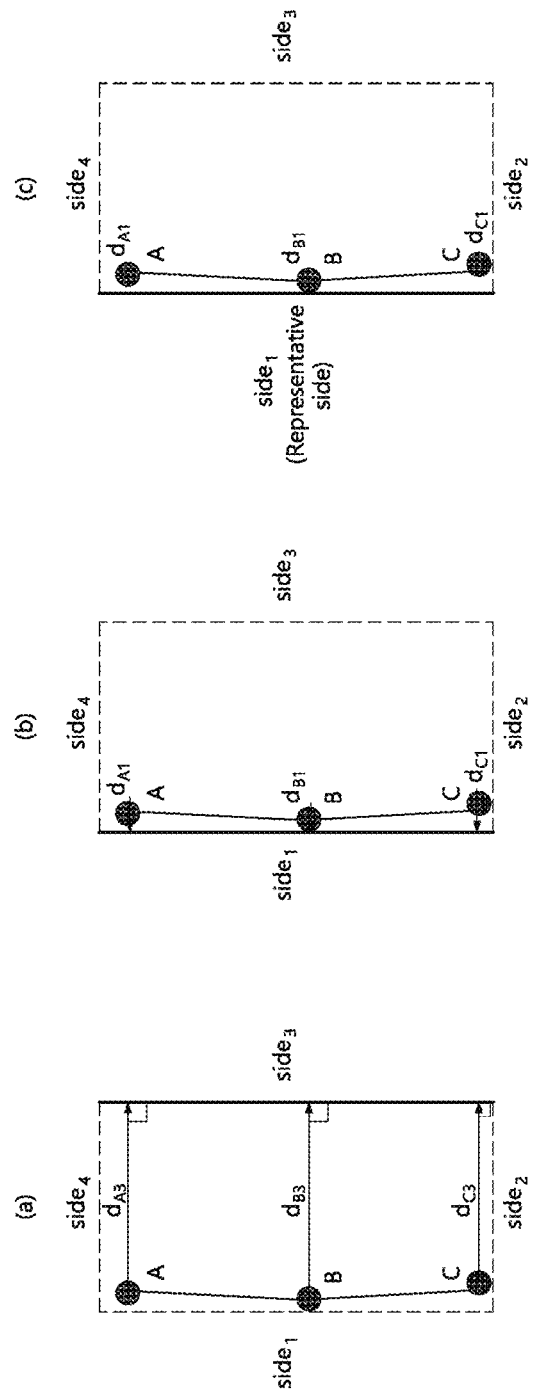
FIG. 9 to FIG. 11 are diagrams for describing a method for determining a representative side according to an embodiment.

Referring to FIG. 9, a representative side of an I-shaped box may be determined by calculating vertical projection distances between three peak points A, B, and C and four box sides $side_1$, $side_2$, $side_3$, and $side_4$. The three peak points may include points A and C at both ends of a point group forming the I shape and a point C positioned at the center. Information on the peak points A, B, and C is included in shape information. (a) of FIG. 9 shows distances $d_{A3}$, $d_{B3}$, and $d_{C3}$ when the peak points A, B, and C are vertically projected on the box side $side_3$, (b) of FIG. 9 shows distances $d_{A1}$, $d_{B1}$, and $d_{C1}$ when the peak points A, B, and C are vertically projected on the box side $side_1$, and (c) of FIG. 9 shows a result of determining that the box side $side_1$ is a representative side among the four box sides $side_1$, $side_2$, $side_3$, and $side_4$.

When the points A, B, and C are vertically projected on the four box sides $side_1$, $side_2$, $side_3$, and $side_4$, the sums of squares of distances can be calculated as follows.

$$D_1 = (d_{A1})^2 + (d_{B1})^2 + (d_{C1})^2$$

$$D_2 = (d_{A2})^2 + (d_{B2})^2 + (d_{C2})^2$$

$$D_3 = (d_{A3})^2 + (d_{B3})^2 + (d_{C3})^2$$

$$D_4 = (d_{A4})^2 + (d_{B4})^2 + (d_{C4})^2$$

$D_1$ represents the sum of squares of vertical projection distances between the box side $side_1$ and the peak points A, B, and C. In the equation for calculating $D_1$, $d_{A1}$ represents the distance between the box side $side_1$ and the point A, $d_{B1}$ represents the distance between the box side $side_1$ and the point B, and $d_{C1}$ represents the distance between the box side $side_1$ and the point C.

$D_2$ represents the sum of squares of vertical projection distances between the box side $side_2$ and the peak points A, B, and C. In the equation for calculating $D_2$, $d_{A2}$ represents the distance between the box side $side_2$ and the point A, $d_{B2}$ represents the distance between the box side $side_2$ and the point B, and $d_{C2}$ represents the distance between the box side $side_2$ and the point C.

$D_3$ represents the sum of squares of vertical projection distances between the box side $side_3$ and the peak points A, B, and C. In the equation for calculating $D_3$, $d_{A3}$ represents the distance between the box side $side_3$ and the point A, $d_{B3}$ represents the distance between the box side $side_3$ and the point B, and $d_{C3}$ represents the distance between the box side $side_3$ and the point C.

$D_4$ represents the sum of squares of vertical projection distances between the box side $side_4$ and the peak points A, B, and C. In the equation for calculating $D_4$, $d_{A4}$ represents the distance between the box side $side_4$ and the point A, $d_{B4}$ represents the distance between the box side $side_4$ and the point B, and $d_{C4}$ represents the distance between the box side $side_4$ and the point C.

As described above, after calculation of the sums $D_1$, $D_2$, $D_3$, and $D_4$ of the squares of the distances when the points A, B, and C are vertically projected on the four box sides $side_1$, $side_2$, $side_3$, $side_4$, a box side having the smallest value can be determined as a representative side.

In step S620 of determining the representative side of the L-shaped box, the two best representative sides that represent characteristics of the L shape among the four box sides may be determined. Since the L shape consists of two sides, i.e., the first side and the second side, a box side having the smallest distance from the two points forming the first side and a box side having the smallest distance from the two points forming the second side may be determined as two representative sides of the L-shaped box.

Figure 10:
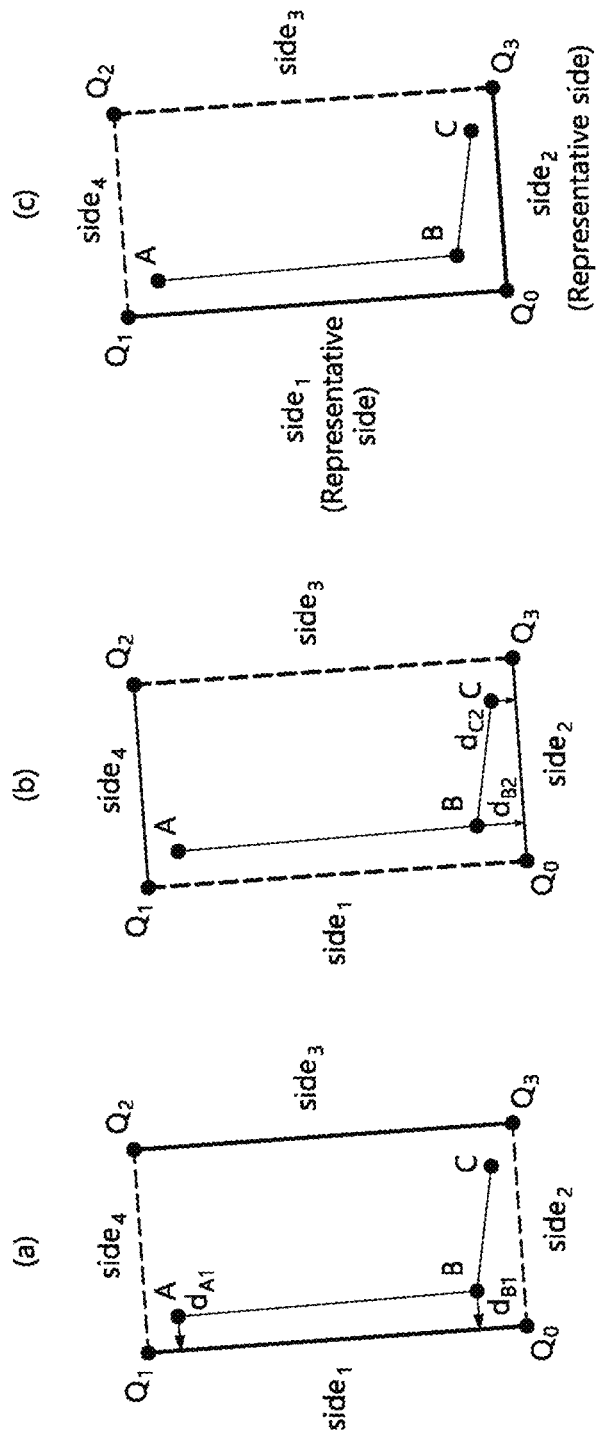

Referring to FIG. 10, to determine representative sides of an L-shaped box, three peak points A, B, and C of point groups forming the L shape may be extracted. Since the L shape consists of the first side AB and the second side BC, the three peak points may include points A and B at both ends of a point group forming the first side, and an end point C of a point group forming the second side from the point B.

Thereafter, it is possible to select which box side among the four box sides will be compared with the first side AB and which box side will be compared with the second side BC. In order to select a box side to be compared, the slopes of the first and second sides and the slopes of the box sides may be used. When it is assumed that the box is a rectangle with vertices Q0, Q1, Q2, and Q3, the box sides may have the slope of a line segment Q0Q1 (equal to the slope of a line segment Q3Q2) and the slope of a line segment Q1Q2 (equal to the slope of a line segment Q0Q3). Accordingly, the slope of the first side AB, the slope of the line segment Q0Q1, and the slope of the line segment Q1Q2 may be calculated and two box sides having a small slope difference may be selected as comparison target box sides. That is, the first side AB may be compared with the box sides $side_1$ and $side_3$, and the second side BC may be compared with the box sides $side_2$ and $side_4$.

Thereafter, vertical projection distances between the peak points A and B and the box side $side_1$ and vertical projection distances between the peak points A and B and the box side $side_3$ may be calculated, and a box side closer to the peak points may be determined as a representative side. In the same manner, vertical projection distances between the peak points B and C and the box side side$_2$ and vertical projection distances between the peak points B and C and the box side side$_4$ may be calculated, and a box side closer to the peak points may be determined as a representative side.

(a) of FIG. 10 shows distances d$_{A1}$ and d$_{B1}$ when the peak points A and B are vertically projected on the box side side$_1$, (b) of FIG. 10 shows distances d$_{B2}$ and d$_{C2}$ when the peak points B and C are vertically projected on the box side side$_2$, and (c) of FIG. 10 shows a result of determining the box sides side$_1$ and side$_2$ among the four box sides as representative sides.

For comparison between distances for determining representative sides, the following equations may be applied.

$$D_1 = (d_{A1})^2 + (d_{B1})^2$$

$$D_3 = (d_{A3})^2 + (d_{B3})^2$$

D$_1$ represents the sum of squares of vertical projection distances between the box side side$_1$ and the peak points A and B. In the equation for calculating D$_1$, d$_{A1}$ represents the distance between the box side side$_1$ and the point A, and d$_{B1}$ represents the distance between the box side side$_1$ and the point B.

D$_3$ represents the sum of squares of vertical projection distances between the box side side$_3$ and the peak points A and B. In the equation for calculating D$_3$, d$_{A3}$ represents the distance between the box side side$_3$ and the point A, and d$_{B3}$ represents the distance between the box side side$_3$ and the point B.

As described above, after calculation of the sums D$_1$ and D$_3$ of the squares of the distances when two points are projected on each box side, a box side having a smaller value can be determined as a representative side.

Referring to FIG. 8, step S700 of determining whether the detected box is a box in which an overlapping box present therein can be removed may include step S710 of redefining point orders of boxes, step S720 of determining whether an I-shaped box is a box in which an overlapping box can be removed, and step S730 of determining whether an L-shaped box is a box in which an overlapping box can be removed.

Figure 11:
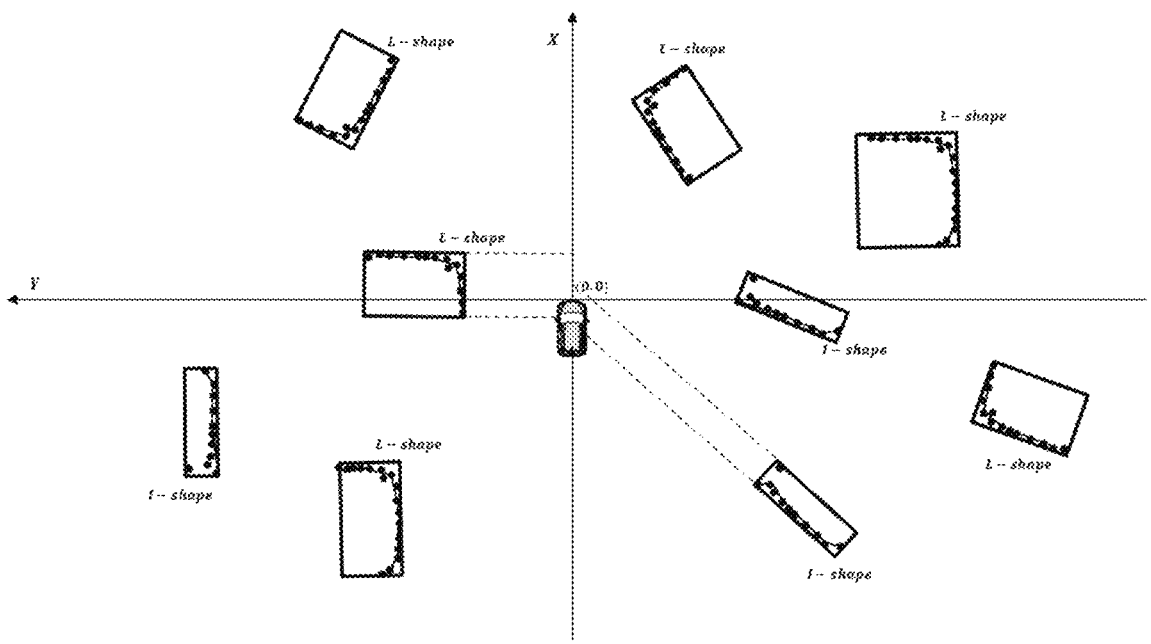

Step S710 of redefining the point orders of the boxes may be performed to determine whether a corresponding box is a box in which an overlapping box present therein can be removed by substituting the same into a generalized formula. In the embodiment, it is possible to determine whether overlapping boxes inside each object are removable by assuming a coordinate plane having the position of the host vehicle as the origin. FIG. 11 is a diagram illustrating a coordinate plane having a host vehicle as the origin. As shown in FIG. 11, the host vehicle and boxes representing objects may be displayed on a two-dimensional Cartesian coordinate system (x-axis and y-axis).

Figure 12:
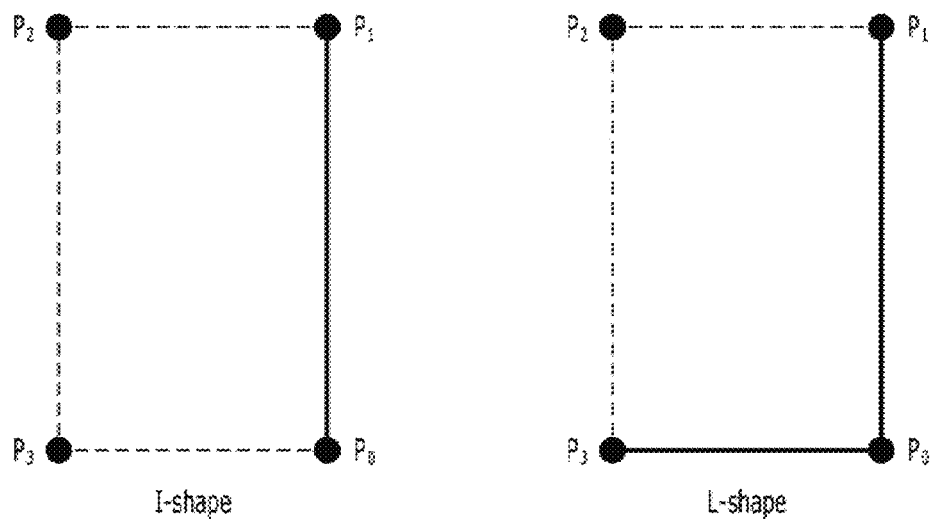
FIG. 12 to FIG. 14 are diagrams for describing a box analysis method according to an embodiment.

In the step of redefining the point orders of the boxes, the orders of the four vertices of the I-shaped box and the L-shaped box are redefined. Referring to FIG. 12, in the I-shaped box, the clockwise vertex of the representative side is set to P0, and P1, P2, and P3 are matched in the counterclockwise direction on the basis of P0. In the L-shaped box, the clockwise vertex of the longer side of the two box sides matching representative sides is set to P0, and P1, P2, and P3 are matched in the counterclockwise direction on the basis of P0.

Step S720 of determining whether the detected I-shaped box is a box in which overlapping boxes present therein can be removed is a step of determining whether the I-shaped box is a box in which small overlapping boxes can be removed when the small overlapping boxes are present therein. Whether the box is a box in which overlapping boxes can be removed may be determined according to distances between the box sides of the corresponding box and the host vehicle, that is, the origin.

Figure 13:
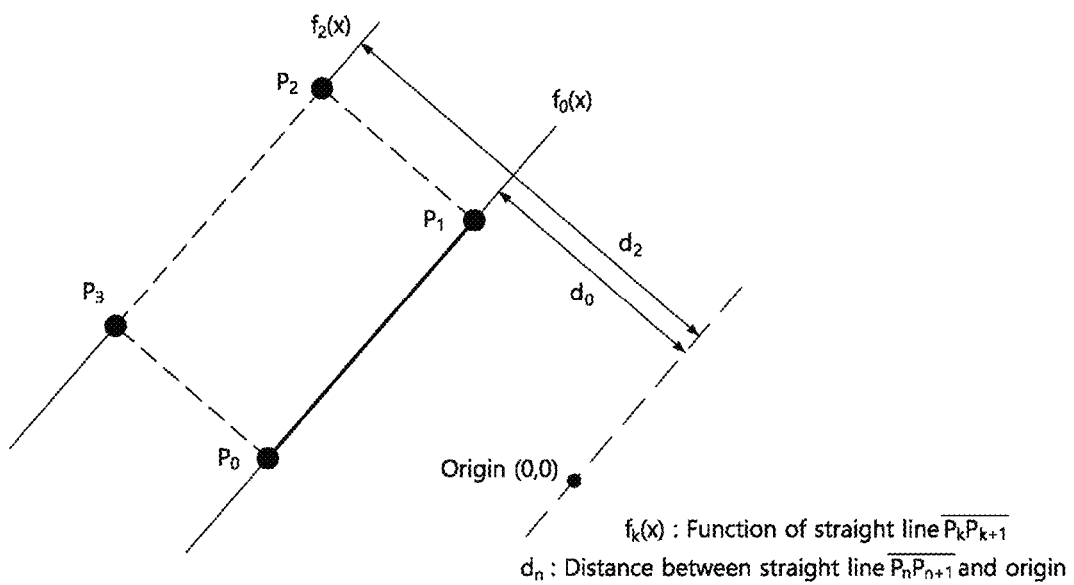

Referring to FIG. 13, a box in which an overlapping box can be removed satisfies all of the following three conditions.

(Condition 1) It is an I-shaped box.
(Condition 2) The distance between a straight line P0P1 and the origin (0, 0) is less than the distance between a straight line P2P3 and the origin (d0<d2).
(Condition 3) The origin does not exist between the straight line P0P1 and the straight line P2P3.

Here, Condition 2 and Condition 3 can be mathematically calculated using a function f(x) of a straight line passing through two points. That is, it is possible to determine whether Condition 2 and Condition 3 are satisfied by calculating a distance d0 between the origin and a function f0 (x) passing through points P0 and P1 and a distance d2 between a function f2(x) passing through points P3 and P2 and the origin.

If Condition 2 and Condition 3 are satisfied, an I-shaped box is present around the host vehicle, a representative side is close to the host vehicle, and the remaining box sides are located farther from the host vehicle than the representative side. Since the representative side is an area with a high probability of presence of an object, the host vehicle will not invade the area of the representative side. Accordingly, in the case of an object farther than the representative side within the box, the need to track the object is reduced. Therefore, in the case of a box satisfying all of Condition 1, Condition 2, and Condition 3, it can be determined as a box in which an overlapping box present therein can be deleted.

Step S730 of determining whether the detected L-shaped box is a box in which overlapping boxes present therein can be removed is a step of determining whether the L-shaped box is a box in which small overlapping boxes can be removed when the small overlapping boxes are present therein. Whether the box is a box in which overlapping boxes can be removed may be determined according to distances between the box sides of the corresponding box and the host vehicle, that is, the origin.

Figure 14:
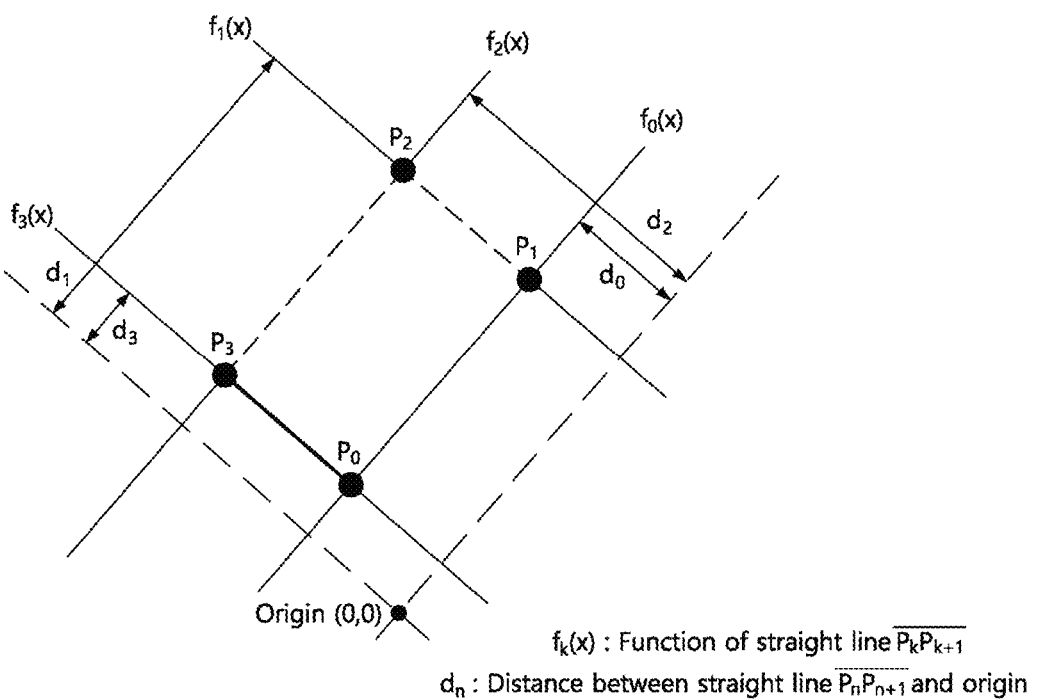

Referring to FIG. 14, a box in which an overlapping box can be removed satisfies all of the following three conditions.

(Condition 1) It is an L-shaped box.
(Condition 2) d0<d2 and d3<d1 are satisfied if a shortest side of representative sides is a straight line P3P0, and d0<d2 and d1<d3 are satisfied if the shortest side of the representative sides is a straight line P1P2.
(Condition 3) The origin does not exist inside the box (f$_0$(0)*f$_2$ (0)>0||f$_3$(0)*f$_1$ (0)>0).

If Condition 2 and Condition 3 are satisfied, an L-shaped box is present around a host vehicle, representative sides of the box are close to the host vehicle, and the remaining box sides are located farther from the host vehicle than the representative sides. Since the representative sides are areas with a high probability of presence of an object, the host vehicle will not invade the areas of the representative sides. Accordingly, in the case of an object farther than the representative sides within the box, the need to track the object is reduced. Therefore, in the case of a box satisfying all of Condition 1, Condition 2, and Condition 3, it can be determined as a box in which an overlapping box present therein can be deleted.

Referring to FIG. 8, step S800 of determining whether the small overlapping boxes are completely included in the large and then removing the small overlapping boxes may include a step of determining whether all of four vertices of the overlapping boxes are included in the target box.

Figure 15:
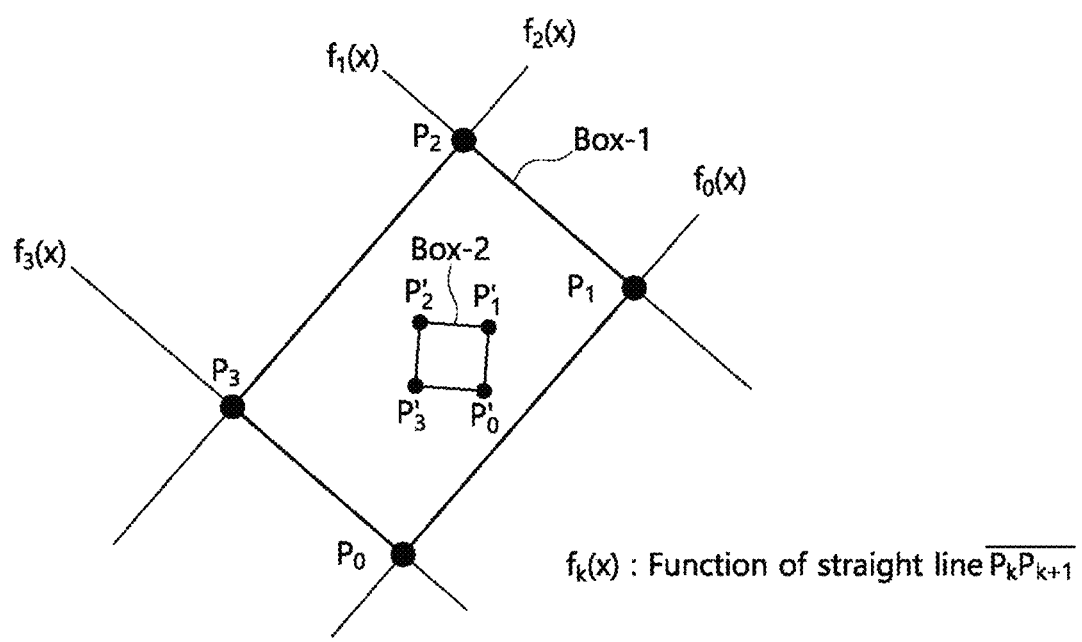
FIG. 15 is a diagram for describing a method of removing an overlapping box according to an embodiment.

Referring to FIG. 15, upon determining that a first box Box-1 is a box in which an overlapping box can be removed, a second box Box-2 included in the first box Box-1 can be removed.

When the first box Box-1 has vertices P0, P1, P2, and P3, the four sides of the first box Box-1 may be represented as a function $f_k(x)$ of a straight line passing through two points.

When the second box Box-2 has vertices P0', P1', P2', and P3', if all of four points Pi'(xi', yi') (i=0, 1, 2, 3) are present in the first box Box-1, the following formulas can be satisfied.

When both the above two formulas are satisfied, all the vertices P0', P1', P2', and P3' of the second box Box-2 are present in the first box Box-1. Accordingly, the second box Box-2 included in the first box Box-1 can be removed.

As described above, the object detection method according to the embodiment can determine whether a large box includes unnecessary overlapping objects that are removable using shape information of the large box to which one object is fitted, and remove the overlapping objects upon determining that the overlapping objects are removable. As a result, unnecessary objects are not considered in the object tracking step after object detection, to allow a more efficient lidar recognition system. In addition, since the best box that reflects the shape of an object is not omitted by preventing errors due to erroneously detected boxes in the process of selecting an associated box during track generation, a track can be more accurately expressed in the shape of the object.

Figure 16:
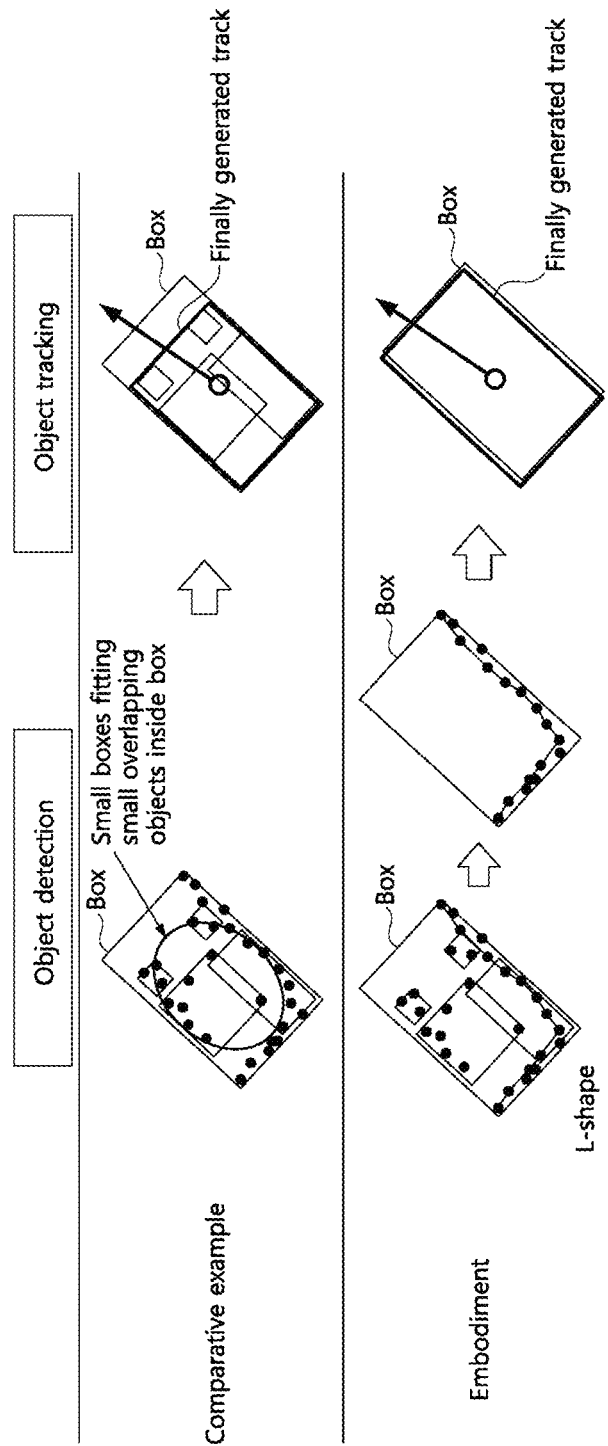
FIG. 16 and FIG. 17 are diagrams for describing a difference between a comparative example and an embodiment.
Figure 17:
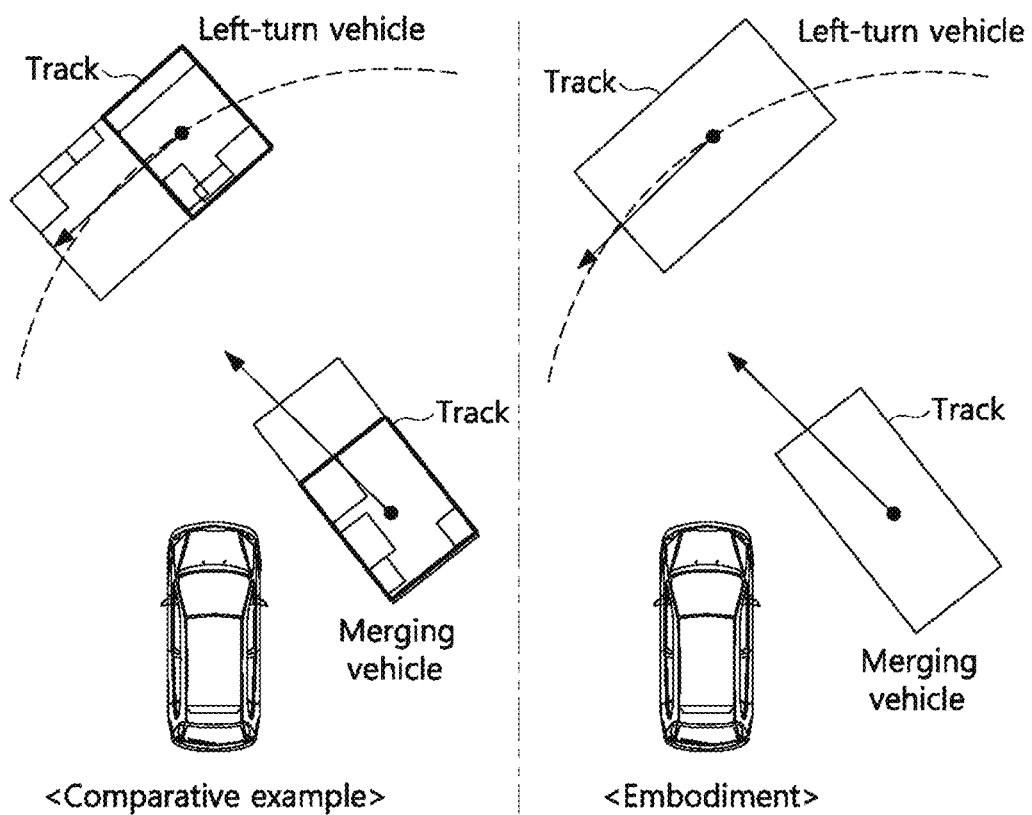

FIGS. 16 and 17 are diagrams for describing a difference between a comparative example and an embodiment.

FIG. 16 is a diagram for describing comparison between object detection methods and object tracking methods according to the comparative example and the embodiment.

Referring to FIG. 16, during object detection, point cloud type lidar data is grouped and boxes are generated according to according to grouped results in both the comparative example and the embodiment. Accordingly, boxes fitting largest objects and small boxes fitting small overlapping objects present therein may be detected.

According to the comparative example, since the object tracking step is performed in a state in which the small boxes are overlapped, a part of the box fitting the largest object may be omitted due to the overlapping boxes when an associated box is selected, and as a result, a finally generated track may differ from the shape of the real object.

On the other hand, according to the embodiment, when the box fitting the largest object is generated, a process of determining whether overlapping boxes present therein can be deleted using L-shape (or I-shape) shape information, and if possible, deleting the overlapping boxes. Thereafter, the object tracking step is performed in a state in which the overlapping objects have been deleted. Accordingly, the best box that reflects the shape of the object is not omitted when an associated box is selected, and thus a track can be more accurately represented in the shape of the object.

FIG. 17 is a diagram for describing a difference between tracks generated according to the comparative example and the embodiment.

Referring to FIG. 17, according to the comparative example, since the object tracking step is performed in a state in which small boxes are overlapped, it is not easy to generate a track having an accurate object shape due to the overlapping boxes. Accordingly, the finally generated track may be different from the shape of the real object. Therefore, it may be difficult to precisely respond to a left-turning vehicle or a merging vehicle.

On the other hand, according to the embodiment, since overlapping objects are deleted using shape information of a largest object, the outer shape of a track having high similarity to the shape of the real object may be generated. Accordingly, it is possible to precisely respond to left-turning vehicles and merging vehicles.

Figure 18:
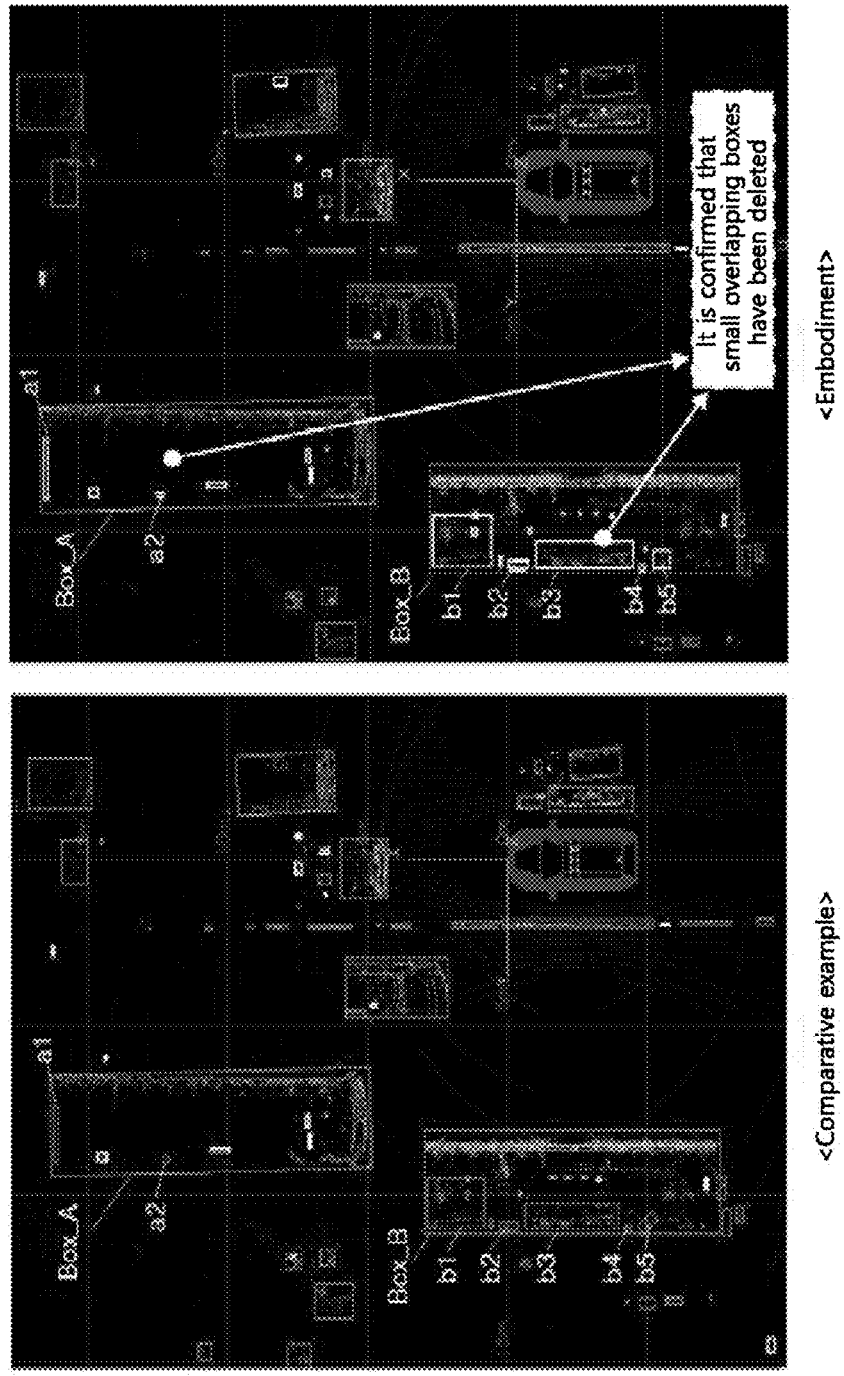
FIG. 18 and FIG. 19 are diagrams illustrating simulation results according to the comparative example and the embodiment.
Figure 19:
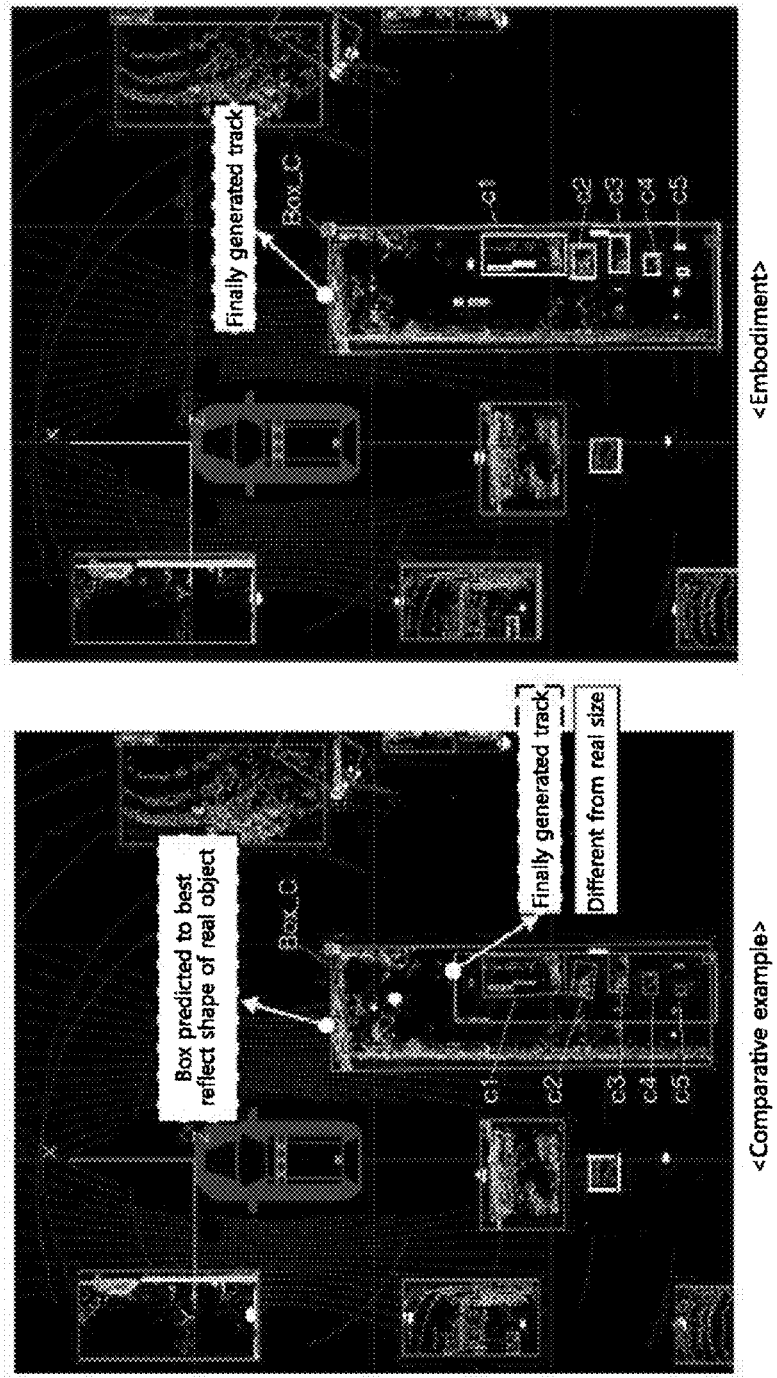

FIGS. 18 and 19 are diagrams showing simulation results according to the comparative example and the embodiment. FIG. 18 shows results of simulation of detecting an object using a lidar sensor, and FIG. 19 shows results of simulation of generating a track after object detection.

Referring to FIG. 18, among boxes in simulation images, relatively dark boxes indicate valid boxes, and bright boxes indicate invalid boxes.

According to the result of simulation of detecting an object according to the comparative example, it can be confirmed that small overlapping boxes a1 and a2 in Box_A fitted to the large object are also detected as valid boxes. It can be confirmed that b1, b2, b3, b4, and b5 are detected as valid boxes in Box_B.

According to the result of simulation of detecting an object according to the embodiment, it can be confirmed that the small overlapping boxes a1 and a2 inside Box_A are detected as invalid boxes. It can be confirmed that overlapping boxes b1, b2, b3, b4, and b5 inside Box_B are also detected as invalid boxes.

FIG. 19 shows results of simulation of generating a track after object detection. Among boxes in simulation images, relatively dark boxes indicate valid boxes and bright boxes indicate invalid boxes.

According to the result of simulation of generating a track after object detection according to the comparative example, it can be confirmed that a finally generated track is different from Box_C that is predicted to best reflect the shape of the real object. This is because Box_C, which best reflects the shape of the object, may be omitted during an association process because Box_C and boxes c1, c2, c3, c4, and c5 overlap. As a result, it can be confirmed that the finally generated track has a size different from the real object.

According to the result of simulation of generating a track after object detection according to the embodiment, it can be confirmed that a finally generated track reflects Box_C, which is predicted to best reflect the shape of the real object. According to the embodiment, all of the boxes c1, c2, c3, c4, and c5 overlapping Box_C are detected as invalid boxes. Accordingly, it can be confirmed that the finally generated track reflects Box_C.

The various embodiments described above may be combined with each other as long as they do not deviate from the purpose of the present disclosure and do not contradict each other. In addition, if a component of a certain embodiment is not described in detail, descriptions of components having the same reference numeral in other embodiments may be applied thereto.

The present disclosure can also be embodied as computer readable code or software stored on a computer-readable recording medium such as a non-transitory computer-readable recording medium. Examples of the computer readable recording medium include a hard disk drive (HDD), a solid state drive (SSD), a silicon disc drive (SDD), read-only memory (ROM), random-access memory (RAM), CD-ROM, magnetic tapes, floppy disks, optical data storage devices, etc.

The object tracking device 600 (or components thereof) may be implemented as a computer, a processor, or a microprocessor or may include a processor or a microprocessor. When the computer, the processor, or the microprocessor of the object tracking device 600 reads and executes the computer readable code stored in the computer-readable recording medium, the object tracking device 600 (or components thereof) may be configured to perform the above-described operations/method. In one example, the object tracking device 600 may include a storage or memory configured as a computer-readable recording medium storing the computer readable code or software.

Although the present disclosure has been described focusing on the embodiment, the embodiment is merely an example and does not limit the present disclosure, and those of ordinary skill in the art can understand that various modifications and applications are possible without departing from the essential characteristics of the embodiment. For example, each component specifically described in the embodiment can be modified. Differences related to such modifications and applications should be construed as being included in the scope of the present disclosure defined in the appended claims.

What is claimed is:

1. An object detection method using a lidar sensor, comprising:
   determining whether a box of a target object is a box in which an overlapping object present inside the box is removable on the basis of shape information of the target object obtained by the lidar sensor; and
   generating a box track of the target object after removing the overlapping object according to a determination result.

2. The object detection method using a lidar sensor according to claim 1, wherein the determining of whether the box is a box in which an overlapping object is removable comprises:
   setting a representative side among four box sides forming the box of the target object on the basis of the shape information of the target object; and
   determining whether the overlapping object is removable on the basis of distances between the representative side and the remaining box sides other than the representative side and a host vehicle which includes the lidar sensor.

3. The object detection method using a lidar sensor according to claim 2, wherein the setting of the representative side comprises setting one representative side when the shape information of the target object includes I-shape information and setting two representative sides when the shape information of the target object includes L-shape information.

4. The object detection method using a lidar sensor according to claim 2, wherein the setting of the representative side comprises setting a box side closest to grouped points constituting the shape of the target object among the four box sides as the representative side.

5. The object detection method using a lidar sensor according to claim 2, wherein the setting of the representative side comprises setting one box side closest to points clustered in an I shape in the box as the representative side, when the shape information of the target object includes I-shape information.

6. The object detection method using a lidar sensor according to claim 2, wherein the setting of the representative side comprises setting two box sides closest to points clustered in an L shape in the box as the representative side, when the shape information of the target object includes L-shape information.

7. The object detection method using a lidar sensor according to claim 2, wherein the determining of whether the box is a box in which an overlapping object is removable comprises determining the box as a box in which an overlapping object is removable, when the distance between the representative side and the host vehicle is less than the distances between the remaining box sides and the host vehicle.

8. The object detection method using a lidar sensor according to claim 2, wherein the determining of whether the box is a box in which an overlapping object is removable comprises:
   defining a point order of vertices of the box on the basis of the representative side;
   setting coordinates of the vertices by defining a position of the host vehicle as an origin;
   calculating a function of the representative side of the box and a function of the remaining box sides on the basis of the coordinates of the vertices; and
   determining whether the box is a box in which an overlapping object is removable on the basis of a distance between the function of the representative side and a function passing through the origin and a distance between the function of the box sides and the function passing through the origin.

9. The object detection method using a lidar sensor according to claim 8, wherein the determining of whether the box is a box in which an overlapping object is removable comprises determining the box as a box in which an overlapping object is removable when the shape information of the target object includes I-shape information, the distance between the representative side and the origin is less than a distance between a box side parallel to the representative side and the origin, and the origin is not present between the representative side and the box side parallel to the representative side.

10. The object detection method using a lidar sensor according to claim 8, wherein the determining of whether the box is a box in which an overlapping object is removable comprises determining the box as a box in which an overlapping object is removable when the shape information of the target object includes L-shape information, distances between two representative sides and the origin are less than distances between box sides parallel to the two representative sides and the origin, and the origin is not present inside the box.

11. The object detection method using a lidar sensor according to claim 2, wherein the shape information of the target object includes I-shape information or L-shape information.

12. The object detection method using a lidar sensor according to claim 1, wherein the generating of a box track of the target object after removing the overlapping object according to a determination result comprises:
   removing a box of the overlapping object when all of four vertices of the box of the overlapping object are present within the box of the target object; and
   generating the track on the basis of the box of the target object from which the box of the overlapping object has been removed.

13. The object detection method using a lidar sensor according to claim 1, further comprising:
- clustering point cloud data obtained using the lidar sensor;
- generating a box of at least one object on the basis of clustered points; and
- determining shape information of the object according to a shape of points constituting the object.

14. A non-transitory computer-readable recording medium recording a program that, when executed by a processor, causes the processor to perform an object detection method using a lidar sensor to include steps of:
- determining whether a box of a target object is a box in which an overlapping object present inside the box is removable on the basis of shape information of the target object obtained by the lidar sensor; and
- generating a box track of the target object after removing the overlapping object according to a determination result.

15. An object detection device using a lidar sensor, comprising:
- a lidar sensor for obtaining a point cloud for a target object and a clustering unit for clustering the point cloud;
- an object detection unit for determining whether a box of the target object is a box in which an overlapping object present inside the box is removable on the basis of shape information of the target object and removing the overlapping object according to a determination result; and
- an object tracking unit for generating a track by tracking the box of the target object from which the overlapping object has been removed.

16. The object detection device using a lidar sensor according to claim 15, wherein the object detection unit comprises:
- a representative side determination unit for setting a representative side among four box sides forming the box of the target object on the basis of the shape information of the target object;
- a box analysis unit for determining whether the box is a box in which an overlapping object is removable on the basis of distances between the representative side and the remaining box sides other than the representative side and a host vehicle which includes the lidar sensor; and
- an overlapping box processing unit for determining whether all of four vertices of a box of the overlapping object are present within the box of the target object and removing the box of the overlapping object when the box is a box in which the overlapping object is removable.

17. The object detection device using a lidar sensor according to claim 16, wherein the representative side determination unit sets one box side closest to points clustered in an I shape within the box as the representative side when the shape information of the target object includes I-shape information, and sets two box sides closest to points clustered in an L shape within the box as the representative side when the shape information of the target object includes L-shape information.

18. The object detection device using a lidar sensor according to claim 16, wherein the box analysis unit determines the box as a box in which an overlapping object is removable, when the distance between the representative side and the host vehicle is less than the distances between the remaining box sides and the host vehicle.

19. The object detection device using a lidar sensor according to claim 16, wherein the box analysis unit redefines point order of the vertices of the box on the basis of the representative side, sets coordinates of the vertices by defining a position of the host vehicle as an origin, calculates a function of the representative side of the box and a function of the remaining box sides on the basis of the coordinates of the vertices, and determines whether the box is a box in which an overlapping object is removable based on a distance between the function of the representative side and a function passing through the origin and a distance between the function of the box sides and the function passing the origin.

* * * * *